Figures 1, 6:
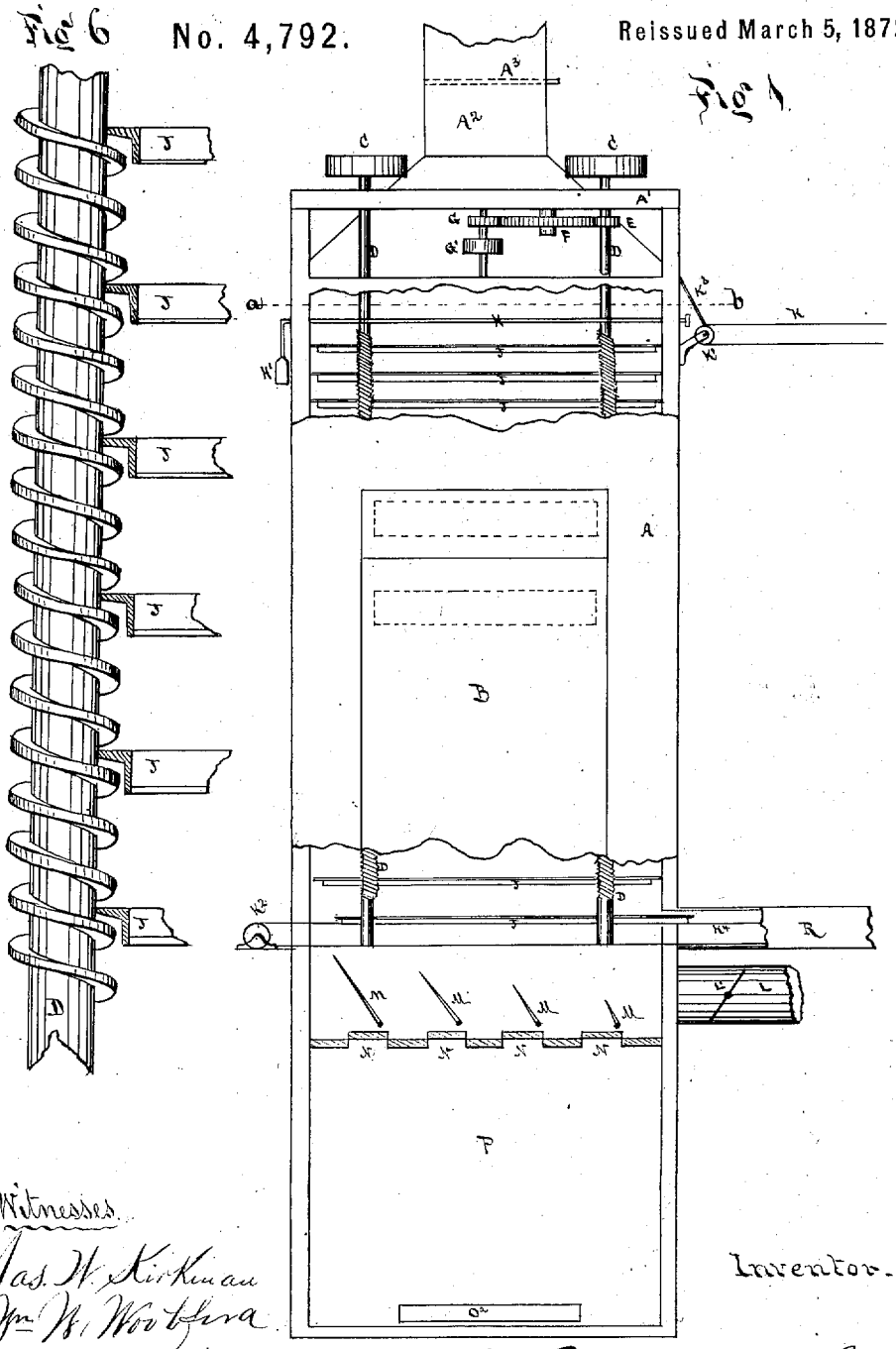

3 Sheets--Sheet 1.

M. P. SMITH.

Improvement in Apparatus for Drying Fruits, Vegetables, &c.

No. 4,792.

Reissued March 5, 1872.

Witnesses.

Jas. H. Kirkman

Wm. N. Woodford

Inventor.

Marshall P. Smith

M. P. SMITH.
Improvement in Apparatus for Drying Fruits, Vegetables, &c.
No. 4,792.
Reissued March 5, 1872.
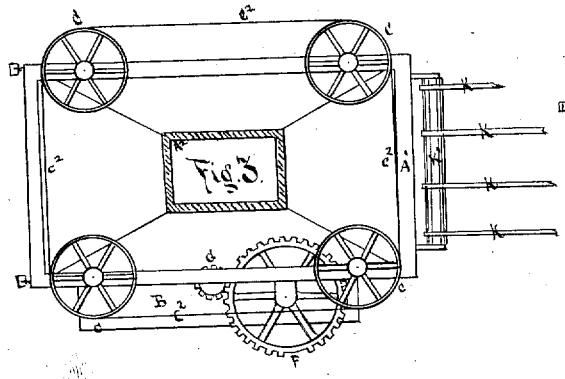
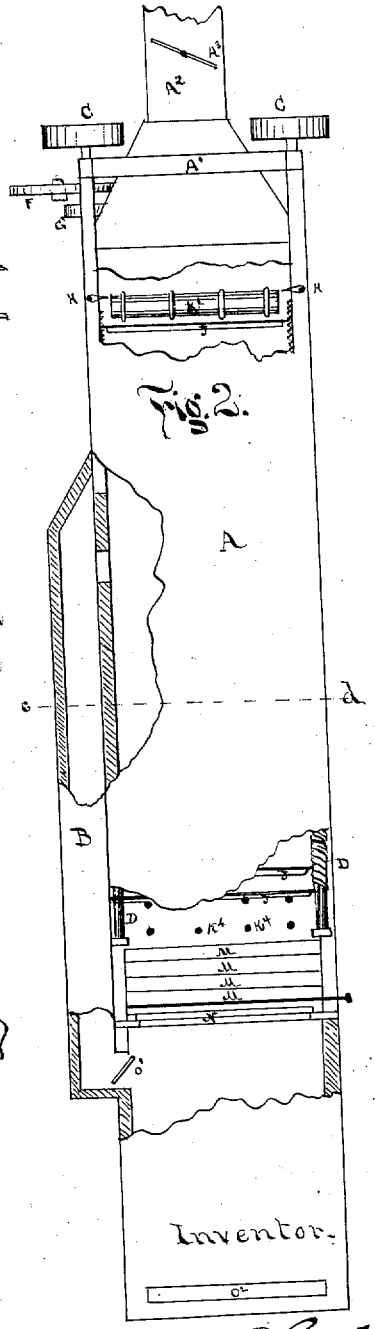
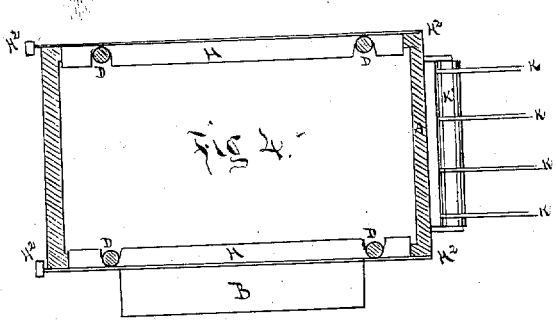
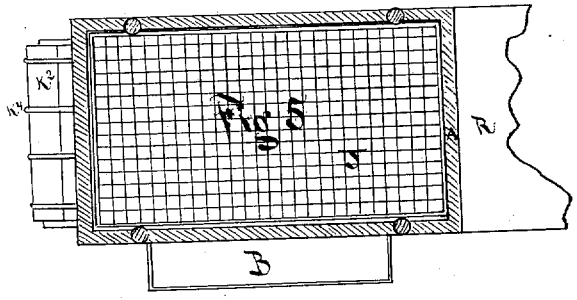
Witnesses
Jas. H. Kirkman
Wm. H. Woolfrey
Marshall P. Smith 3 Sheets--Sheet 3.
M. P. SMITH.
Improvement in Apparatus for Drying Fruits, Vegetables, &c.
No. 4,792. Reissued March 5, 1872.
Fig 8.
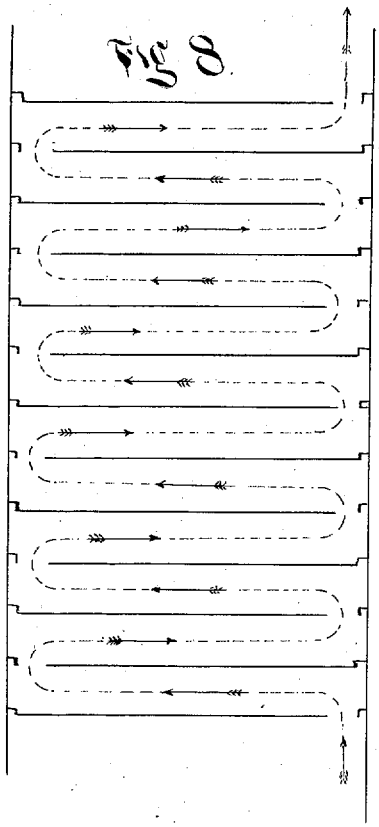
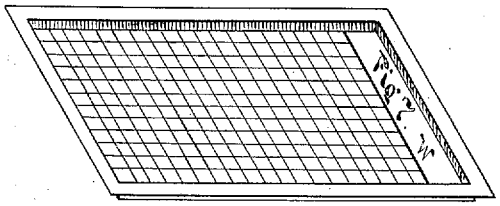
Witnesses.
Jas W. Kirkman
Wm N. Wood Spra
Inventor.
Marshace P. Smith

UNITED STATES PATENT OFFICE.

MARSHALL P. SMITH, OF BALTIMORE, MARYLAND.

IMPROVEMENT IN APPARATUS FOR DRYING FRUIT, VEGETABLES, &c.

Specification forming part of Letters Patent No. 107,417, dated September 13, 1870; reissue No. 4,792, dated March 5, 1872.

I, MARSHALL P. SMITH, of Baltimore, in the county of Baltimore and State of Maryland, have invented a new and Improved Drier, of which the following is a specification:

In 1861 my father, Francis H. Smith, received a patent for (among other things) a new mode of drying fruits and vegetables. His drying-chamber was horizontal; air, heated by a furnace, entered at one end and passed out at the other. The articles to be dried, loaded upon cars, were entered at the end where the warm air escaped, and taken out where it was introduced, and in their passage through the chamber they were subjected to a gradually-increasing temperature, and to air of gradually-increasing dryness; as a consequence, the drying process was slow at first, but increased as the operation progressed, and the effect thereby produced was new and highly beneficial.

The object of my invention, among other things, is to give to an upright vertical chamber the properties that pertain to my father's horizontal one, and also at the same time to produce more economy in the use of heated air in such chamber than has been before attained. When heated air is introduced into a vertical chamber it naturally rises to the top and the upper portions of the chamber become the warmest. This is the reverse of what is required in the process referred to, and to prevent such a result is one of the first objects of my device. The articles to be dried are placed upon a series of trays, which I prefer to make of iron wire-cloth, with meshes as large as the substance to be dried will allow; or they may be made of any other suitable material. These trays have frames made of wood or iron, that fit the sides of the chamber closely as possible and yet allow a free movement through it. The air in its passage upward is thus compelled to move through the meshes of the trays and in contact with the fruits and vegetables, and it becomes cooled as it progresses, and more and more charged with moisture. Particular care is requisite that no place be left in the structure through which the air can pass to the top without coming in contact with the articles, as described. Four screws, extending from the top to the bottom, are let into the walls of the chamber, as shown in the drawing. The edges of the trays are not fastened or attached to these screws, but rest upon the thread loosely, so that they can be detached and removed from the chamber when the operation is completed. By the revolutions of these screws the thread, acting as a continuous inclined plane, raises or lowers the trays, as may be desired. The several screws are connected together by pulleys and a belt—or by gearing, which will be found preferable, as belts are liable to slip—at the top, and when they are turned the whole series of trays are set in motion. The articles to be dried are thus gradually passed through the chamber from the top to the bottom. When the operation is completed the trays drop from the ends of the threads of the screws onto a carrier, which takes them from the chamber. When the substance to be dried is, like grain, too small to rest on iron wire-cloth of large mesh, I make my trays with a portion of the bottom at one end removed, as shown in Fig. 7, W, and in placing the trays in the tunnel these spaces are in reversed order, as shown in Fig. 8. The heated air, entering at the bottom, passes up through the space S, over tray S′, through space T, over tray T′, and so on, as shown by the dotted arrow line. The trays should be placed so near to each other that the dry current, passing thus successively over the contents of each tray, will be gradually lowered in temperature and reduced in dryness as before. Should the chamber be so high, or the moisture in the articles so great, that the drying capacity of the air should become exhausted before reaching the top, I have provided a pipe or channel, B, to convey fresh or hot air to the upper portion of the chamber to reinvigorate the drying. This channel may be of wood or metal, and may start from the lower chamber, as per drawing, or may branch off from the blast-pipe L.

In the drawing hereto annexed, Figure 1 is an elevation of one side of the chamber or tower, cut away in places to exhibit the interior arrangement. Fig. 2 is an elevation of the front of the chamber, also partly cut away for the same purpose. Fig. 3 is a view of the top of the chamber, showing the pulleys and gearing which rotate the screws. Fig. 4 is a section through the line *a b*, showing the operation of the vibrating flanges and endless chains. Fig. 5 is a section through line *c d*. Fig. 6 shows the vertical screws in perspective and the trays in section.

Similar letters indicate corresponding parts.

A A is the frame of the chamber or tower, which may be constructed of brick, lumber, or other materials. Its size will depend upon the nature of the substance to be dried, and its height should be much greater than its diameter. It should be placed in a building of three or more stories in height, to allow of easy access to the upper and lower ends, and it will be found most economical to make it twenty-five to fifty feet high, and four to eight feet in diameter. A chimney, $A^2$, with a damper, $A^3$, is provided to increase and regulate the draught. The lower portion of the chamber, from the ends of the screws downward, should be placed in the cellar of the building, and in the space marked P, Fig. 1, a furnace, such as is used for heating dwellings, is placed, cold air being admitted through the opening $O^2$. Above the furnace are valves or dampers N N, which, when fully open, give free escape to the heated air into the chamber above, and by closing regulate the quantity to any degree. L is a pipe entering the chamber above these dampers, having a valve, L′. Through this pipe heated air is forced by a fan into the chamber, and, impinging on the deflectors M M, is deflected upward. These deflectors are of increasing superficial area, and vibrate on journals at their lower edges, and by adjusting these the hot air from the fan can be uniformly distributed over the whole chamber. The hot blast and the furnaces can be used together or separately, as required, and when the blast is not used the deflectors may be dispensed with. D D are large vertical screws, having a long pitch, and deeply-cut thread to give sufficient hold to the edges of the trays, as shown in Fig. 6, J J. The lower ends of these screws rest in steps securely fastened to the sides of the chamber, and they are also steadied by guides at suitable distances to keep them from swaying. The upper ends of these screws carry pulleys *c c*, around which passes a belt, $c^2$, Fig. 3, giving them a simultaneous motion. Gearing may be substituted for these pulleys. The screws rest in journals fastened to the framing A′. The upper part of the thread of the screw D is removed from a point about an inch below the surface of the flanges H to the end, in order that the tray, when having a falling motion, may be entered easily and not engage with the thread until the flange is lowered, and the lower end of the screw is also similarly reduced, in order that when the tray reaches the end of the thread it may drop or rest upon the carrier $K^4$ $K^2$, and be withdrawn from the chamber. When the trays have a rising motion the revolution of the mechanism is reversed. The trays are entered by the carriers $K^4$ $K^2$, and raised by hand or otherwise until the thread of the screw engages with them. Upon arriving at the top they are lifted by the flanges and removed from the chamber. On one of the screws is a small pinion, E, engaging in a large spur-wheel, F, which also engages in pinion G on a counter-shaft, which receives motion from a pulley, G′. From the spur-wheel F one or more teeth are removed, so that, whereas the pulley G′ and pinion G are in constant motion, the spur-wheel F will revolve only so far as the teeth are continuous, and when the vacant space is reached motion ceases in the vertical screws. By this device the trays can be introduced without accident while the screws are at rest, and by varying the diameter of the spur F, and consequently the number of revolutions which the screws will make before stopping, the distance between the trays may be regulated at pleasure. The carrier $K^4$ $K^2$ is formed of ropes or chains and rollers, like the upper one, and may be extended to the packing-room or elsewhere through the covered channel R. K K are endless ropes or chains passing over roller $K^1$, close to the front of the chamber, and also over similar rollers at convenient distances from the first. These ropes receive continuous motion from pulleys not shown. H H are flanges or bars vibrating on journals $H^2$, which project outside the chamber, and on one end of each flange are weights $H^1$ attached at right angles to the face of the flanges, which serve to keep them level until the tray is properly entered and rested upon them. $K^3$ is a narrow door, which is raised to allow the tray to enter, and then closed.

In operation, the tray is placed upon the ropes K, which carry it into the chamber and over the flanges H, which are depressed by the weight of the tray or by moving the weighted levers until the tray rests upon the thread of the vertical screw. When one tray has been placed in position, the spur F is moved by hand or a simple lever, not shown, far enough for the teeth to engage in pinion G′, when the screws at once revolve till F has made one full revolution and stops. Another tray is then introduced, motion communicated a second time, and so on, without intermission.

I am aware that drying-chambers have been devised before my invention with rising and falling perforated platforms, and such I do not broadly claim; but in none of them have the platforms been made to fit the sides of the chamber closely, so as to compel the air to pass through the perforations in the trays. In those devices there has always been a great waste of heat by much of the heated air escaping to the top without coming into contact with the drying substance; but by compelling the air to pass upward through the meshes of the trays, and in contact with the drying substance, little escapes without becoming fully saturated with moisture. Should, for any purpose, it be desired to reverse the process and subject the articles to the greatest heat at first, my close-fitting trays will effect that object also. In this case the articles should be entered at the bottom and made to rise through the chamber.

What I claim as new, and desire to secure by Letters Patent, is—

1. The arrangement of a series of trays resting in the threads of vertical screws, and receiving a falling or rising motion by the revolution of those screws in a chamber or tower supplied with a current or currents of hot air, substantially in the manner shown and described.

2. The arrangement of a series of trays or platforms, receiving motion from the revolutions of vertical screws, in a vertical drying-chamber, when so constructed and arranged that the current of air shall pass over each tray in succession, in the manner and for the purpose substantially as described.

3. The vibrating flanges H, when used in combination with the vertical screws, in the manner and for the purpose substantially as described.

4. The carriers $K K^1 K^2 K^4$, when used in combination with the vertical screws and flanges, in the manner and for the purposes substantially as described.

5. The vertical screws D, when used in combination with the vertical chamber A, and for the purpose of raising or lowering trays, in the manner and for the purpose set forth.

6. The deflectors M M and dampers N N, when constructed in the manner and for the purposes substantially as described.

7. The arrangement of pinions G and G′ and spur F, having one or more teeth removed, when used for the purpose of giving intermitting motion to the vertical screws, in the manner substantially as described.

8. The arrangement of a series of movable and detachable platforms or trays, receiving a rising or falling motion in a chamber or tower supplied with a current or currents of heated air, and constructed and arranged to fit the chamber closely, (and yet allow free motion,) so that the heated air which is introduced at the lower end of the chamber will be caused to pass through all of the trays in succession before escaping from the chamber.

MARSHALL P. SMITH.

Witnesses:
JAS. W. KIRKMAN,
W. G. BOWDOIN.